US010047876B2

(12) United States Patent
Lambert et al.

(10) Patent No.: US 10,047,876 B2
(45) Date of Patent: Aug. 14, 2018

(54) FLOW APPARATUS

(71) Applicant: LINDE AKTIENGESELLSCHAFT, Munich (DE)

(72) Inventors: Piers Lambert, Camberley (GB); George Gregory, Cambridge (GB); Oliver Gobold, Cambridge (GB)

(73) Assignee: LINDE AKTIENGESELLSCHAFT, Munich (DE)

( * ) Notice: Subject to any disclaimer, the term of this patent is extended or adjusted under 35 U.S.C. 154(b) by 181 days.

(21) Appl. No.: 14/431,397

(22) PCT Filed: Sep. 25, 2013

(86) PCT No.: PCT/EP2013/069935
§ 371 (c)(1),
(2) Date: Mar. 26, 2015

(87) PCT Pub. No.: WO2014/053371
PCT Pub. Date: Apr. 10, 2014

(65) Prior Publication Data
US 2015/0247589 A1 Sep. 3, 2015

(30) Foreign Application Priority Data
Oct. 1, 2012 (GB) .................................. 1217551.9

(51) Int. Cl.
*F17D 3/00* (2006.01)
*F16K 37/00* (2006.01)
(Continued)

(52) U.S. Cl.
CPC .......... *F16K 37/0025* (2013.01); *F16K 1/307* (2013.01); *F16K 37/0033* (2013.01); *F17C 13/04* (2013.01); *Y10T 137/8242* (2015.04)

(58) Field of Classification Search
CPC .......... F17C 13/04; F17C 13/00; F16K 1/307; F16K 37/0033
(Continued)

(56) References Cited

U.S. PATENT DOCUMENTS 3,911,974 A   10/1975   Kuykendall
4,042,465 A * 8/1977   Morong, III ......... G01N 27/404
                                                 204/406

(Continued)

FOREIGN PATENT DOCUMENTS

CA        2448594 C    9/2002
CN        1414296 A    4/2003
(Continued)

OTHER PUBLICATIONS

First Office Action issued by the State Intellectual Property Office of the People's Republic of China in Application No. 201380051629.2, dated Mar. 25, 2016.
(Continued)

*Primary Examiner* — Craig Schneider
*Assistant Examiner* — Angelisa L Hicks
(74) *Attorney, Agent, or Firm* — Meunier Carlin & Curfman LLC

(57) ABSTRACT

The present invention provides a flow apparatus (10) for a vessel storing fluid under pressure having a flow control valve (12) having a housing (14) and an outlet aperture (16) and further including a valve seat (18) and a sealing member (20) for sealing against said seat (18) such as to obturate said outlet (16), said apparatus further including an actuator (22) connected to said sealing member (20) for moving it between an open position of the valve in which it unobturates the outlet aperture (16) and a closed position in which it obturates said outlet, characterized by an electrical switch (24) for controlling the supply of electrical current to one or (Continued)

more electrical components (25) and wherein said switch is operably connected to said sealing member (20) to allow for the passage of current when said valve (12) is in a first position and to restrict the flow of current when said valve (12) is in a second position. Such an apparatus may be used to control the flow of gas from a gas bottle and to ensure that electricity is only supplied when needed, thus prolonging battery life and reducing maintenance.

23 Claims, 5 Drawing Sheets

(51) Int. Cl.
  *F16K 1/30* (2006.01)
  *F17C 13/04* (2006.01)
(58) Field of Classification Search
  USPC .................. 137/487.5, 553, 554, 555, 556
  See application file for complete search history.

(56) References Cited

U.S. PATENT DOCUMENTS

| | | | | |
|---|---|---|---|---|
| 4,872,482 A * | 10/1989 | Jarrett | ............... | F17C 13/04 137/382.5 |
| 4,957,274 A * | 9/1990 | Hood | ............... | F16K 31/042 251/129.04 |
| 4,999,519 A * | 3/1991 | Kitsukawa | ......... | H03K 19/0016 326/110 |
| 5,057,822 A * | 10/1991 | Hoffman | ............... | A61M 16/10 128/202.22 |
| 5,268,660 A * | 12/1993 | Cappelli | ................. | H01P 1/122 333/104 |
| 5,518,028 A * | 5/1996 | Walker | ............... | F16K 37/0033 137/554 |
| 7,025,089 B1 * | 4/2006 | Marsac | ............... | F16K 37/0033 137/554 |
| 8,573,209 B2 * | 11/2013 | Bathe | ................... | A61M 16/20 128/203.14 |
| 2003/0016847 A1 * | 1/2003 | Quintana | ........... | G07C 9/00563 382/124 |
| 2004/0046137 A1 | 3/2004 | Herbert et al. | | |
| 2009/0230338 A1 * | 9/2009 | Sanders | ................. | G05B 19/39 251/129.01 |
| 2011/0095008 A1 * | 4/2011 | Birt, Jr. | ................ | B23K 9/0956 219/130.01 |

FOREIGN PATENT DOCUMENTS

| | | |
|---|---|---|
| CN | 2752574 Y | 1/2006 |
| CN | 201103743 Y | 8/2008 |
| CN | 201228802 Y | 4/2009 |
| CN | 102235505 A | 11/2011 |
| DE | 4119496 A1 | 12/1992 |
| JP | 59183176 A | 10/1984 |
| KR | 20020096072 A | 12/2002 |
| WO | 2012094008 A1 | 7/2012 |

OTHER PUBLICATIONS

International Preliminary Report on Patentability, dated Apr. 7, 2015, in International Application No. PCT/EP2013/069935.
Great Britain Intellectual Property Office Search Report for Great Britain Patent Application No. GB1217551.9, dated Jan. 19, 2013.
International Search Report and Written Opinion, dated Feb. 11, 2014, in International Application No. PCT/EP2013/069935.
Examination Report No. 1 issued by the Australian Intellectual Property Office in corresponding Australian Application No. 2013326707, dated Jul. 18, 2017.

\* cited by examiner

FLOW APPARATUS

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

The present invention relates to a flow apparatus such as a fluid flow control valve and relates particularly but not exclusively to a flow apparatus having associated electrical components to which it is desirable to control the flow of electrical current dependent upon the operational state of the flow control valve.

Presently, it is well known that the flow of fluid through a valve can be controlled manually or electronically by means of a handle or actuator coupled to the valve such as to allow for the opening and closing thereof as and when desired. It is also known to use electronic flow display apparatus incorporating advanced information systems based on the position of the valve. The supply of electricity to such display apparatus can be problematic, particularly when the valve is used in portable or remote applications. Recent developments in display apparatus have placed an even higher demand on the power requirement of such devices and the supply of power from a battery source alone can result in shorter than desired system deployment times and greater maintenance demands as the batteries need replacing more regularly.

In view of the above, there exists a requirement for an arrangement that can better manage the draw of current from a source of power when used in relation with electrical components associated with a flow apparatus and it is an object of the present invention to provide an arrangement of power management suitable for use in such applications which may reduce if not eliminate the current draw requirements.

BRIEF SUMMARY OF THE INVENTION

Accordingly, the present invention provides a flow apparatus for a vessel storing fluid under pressure having a flow control valve having a housing and an outlet aperture and further including a valve seat and a sealing member for sealing against said seat such as to obturate said outlet, said apparatus further including an actuator connected to said sealing member for moving it between an open position of the valve in which it unobturates the outlet aperture and a closed position in which it obturates said outlet, characterised by an electrical switch for controlling the supply of electrical current to one or more electrical components and wherein said switch is operably connected to said sealing member to allow for the passage of current when said valve is in a first position and to restrict the flow of current when said valve is in a second position.

In one arrangement said first position is an open position of the valve and said second position is a closed position of the valve. In an alternative arrangement said first position is a closed position of the valve and said second position is an open position of the valve.

Advantageously, that said switch comprises a hall sensor and said apparatus further includes a magnet movable with said sealing member between a first position in which it is in association with the hall sensor and indicates a first operable state of the valve and a second position in which it is not in association with the hall sensor and indicates a second operable state of the valve.

Preferably, said hall sensor is operable to restrict flow of current to said electrical components when said magnet is in said first position and allow full flow of current to said electrical components when in said second position. Alternatively, said hall sensor is operable to restrict flow of current to said electrical components when said magnet is in said second position and allow full flow of current to said electrical components when in said first position.

Conveniently, said electrical switch is mounted on a base portion and said magnet is mounted on a pivotal arm having a pivot point and being pivotal between a first position in which the magnet is in close proximity to said switch and a second position in which the magnet is distanced from said switch.

In one arrangement said base portion comprises said valve whilst in another arrangement said base portion comprises said housing.

Preferably, said pivotal arm comprises a lost motion mechanism including a slot therein and wherein said actuator includes a pin mounted for movement therewith between a first position in which it is not engaged with said slot and a second position in which it is engaged with said slot and causes said arm to rotate about said pivot point and cause said magnet to move towards said first position.

Preferably, said lost motion mechanism comprises a Geneva mechanism.

The arrangement may also include a biasing member for biasing said pivotal arm towards said second position. Alternatively, the arrangement may include a biasing member for biasing said pivotal arm towards said first position.

The arrangement may also include an electrical component having a fully operational mode and a standby mode and wherein said switch is connected thereto for allowing a first, higher, level of current to said component when in said fully operational mode and a second, lower, level of current to said component when in said standby mode.

In a preferred arrangement there is provided an electrical circuit in the form of, for example, a circuit board including said switch and being connected to a supply of electricity and said electrical component and wherein said circuit board is mounted on a surface of the housing.

Advantageously, said circuit board may comprise a substantially rigid portion on which said switch is mounted and a flexible portion between said rigid portion and said electrical component.

In one arrangement, said valve comprises a primary on/off control valve for a gas cylinder.

Preferably, said valve further includes a fully open position and a detector for detecting a fully open position of the valve.

Conveniently, said electrical component comprises a visual display unit for displaying gas flow information as determined by the detection of the position of the valve.

In a particular arrangement there is provided a second flow control valve downstream of said valve for controlling the rate of flow from the apparatus and wherein said second control valve includes a position monitor for monitoring the position thereof and wherein said position monitor is operably connected to a visual display unit for displaying gas flow information as determined by the detection of the position of the second control valve.

Preferably, said apparatus includes a circuit board including said position monitor and being connected to a supply of electricity and said electrical component and wherein said circuit board is mounted on a surface of the base portion.

BRIEF DESCRIPTION OF THE SEVERAL VIEWS OF THE DRAWINGS

The above features of the present invention and others will now be described by way of example only with reference to the accompanying drawings, in which.

DETAILED DESCRIPTION OF THE INVENTION

Figure 1:
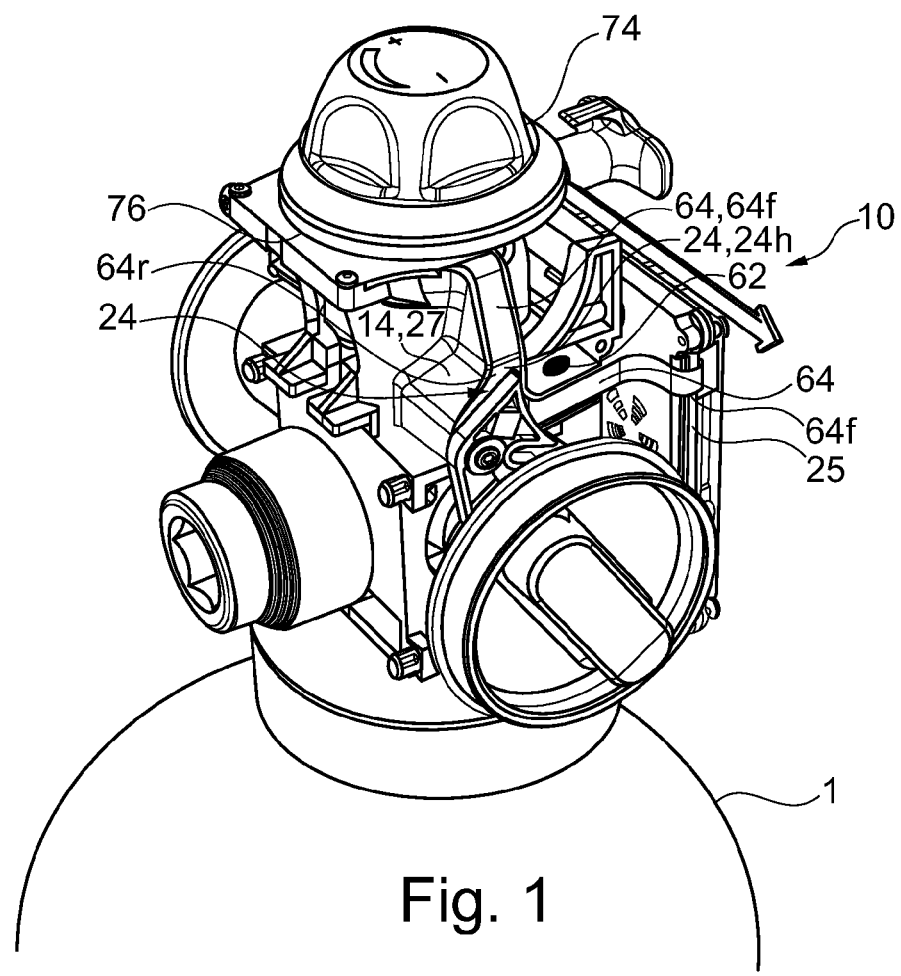
FIG. 1 is an isometric general view of a flow valve incorporating the present invention.
Figure 2:
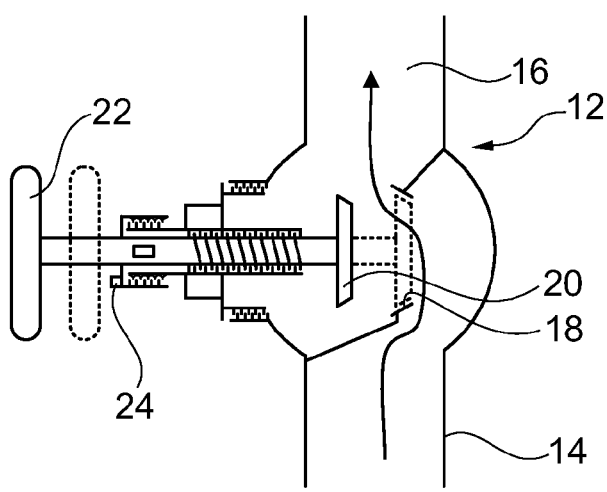
FIG. 2 is a cross-sectional view of a typical valve closure arrangement as may be used in the arrangement of FIG. 1.
Figure 3:
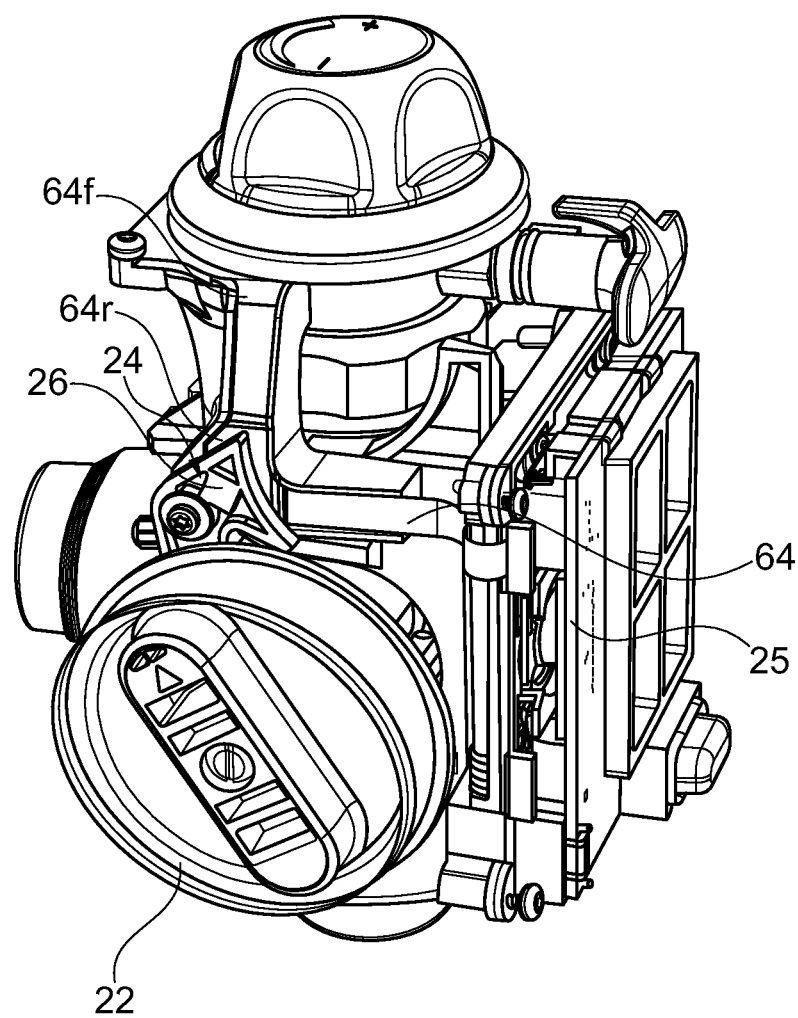
FIG. 3 is a further isometric view of the arrangement of FIG. 1 but better illustrates a switching element of the invention.
Figure 4:
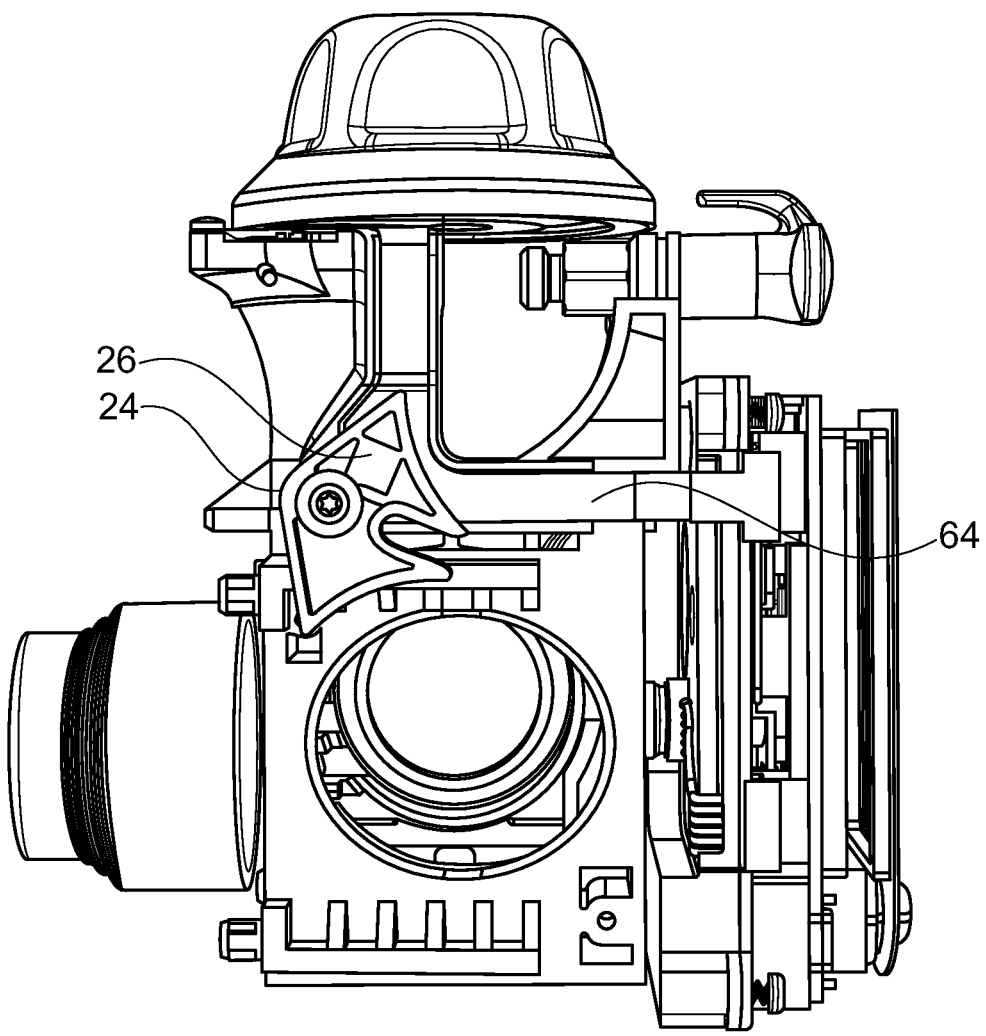
FIG. 4 is a skeleton view of a valve outer casing showing the mounting of a portion of the switching mechanism relative thereto.

Referring now to the drawings in general but particularly to FIGS. 1 and 2, a flow apparatus 10 comprises a flow control apparatus for controlling the flow of fluid, such as gas, from a container 1 and includes a flow control valve 12 having a housing 14 and an outlet aperture 16 and further includes a valve seat 18 and a sealing member 20 for sealing against the seat 18 such as to obturate (close) the outlet 16 as and when desired. The valve 12 may comprise the primary on/off control valve of a gas supply system or gas cylinder 1. The apparatus further includes an actuator shown as, for example, a simple manual handle 22 which is connected to the sealing member 20 for moving it between an open position in which it acts to unobturate (open) the outlet aperture 16 and a closed position in which it obturates (closes) the outlet 16. The manual handle may be replaced by an electric solenoid or stepper motor (not shown). A switch shown generally at 24 is provided for controlling the supply of electrical current to one or more electrical components 25 such as, for example, those which are discussed in detail later herein. The switch itself 24 is operably connected to the sealing member 20 in, for example, the manner discussed below such that it is operated upon movement of the valve to allow for the passage of current at one of two levels depending upon the position of the valves. Whilst the two positions may optionally cause current to be prevented from flowing at all or cause current to flow at full rate, it has been found that there is advantage in arranging the switch such as to allow for the flow of current at full rate to a when the valve is in a first position and at a reduced rate when the valve is in a second position. Details of the advantage associated with this alternative arrangement will be discussed later herein. In a preferred arrangement the first position equates to the open position of the valve and the second position equates to the closed position of the valve. However, it will be appreciated that the arrangement may be reversed such that the first position equates to the closed position of the valve and the second position equates to the open position of the valve.

The preferred arrangement allows for the flow of current to be prevented or restricted when the valve is closed and, as this generally equates to an arrangement when the apparatus is not in use, this will also equate to a time during which it is unlikely that the electrical equipment is required to be operational at full capability, or indeed at all. Such an arrangement will, therefore, allow for the reduction or elimination of current flow to the electrical apparatus when the flow apparatus is not in use and will generally assist with battery life and may well reduce maintenance which is particularly advantageous when the apparatus 10 is used in remote locations or is anticipated to be with customers for prolonged periods of time. Electrical components often have "sleep" modes in which they can operate at reduced current draw levels but do need some current to allow them to move to "awake" mode and this preferred arrangement allows for that to be achieved The alternative arrangement may be used when, for example, it is desired to power up a separate electrical system which may require to be fully active when the valve is in a closed position but "asleep" or off when the valve is in the open position. An example could be a gas leak detection system able to detect low level leakage during prolonged periods of apparatus inactivity or a simple warning system giving a visual warning that the apparatus 10 is not operational. A light (not shown) may be one example of a visual warning system that may be employed in such an optional arrangement.

Whilst it is possible to provide the switch in any one of a number of arrangements, it has been found that a hall sensor 24h may be used to very good effect, particularly when combined with a simple magnet 26 which may be movable with said sealing member 20 between a first position A in which it is associated with the hall sensor 24h and indicates a first operable state of the valve 12 a second position B in which it is not in association or close proximity with the hall sensor 24h and indicates a second operable state of the valve. Again, it will be appreciated that there are two options for the operation of the hall sensor 24h. In the first arrangement the hall sensor 24h is arranged to restrict or prevent flow of current to the electrical component 25 when the magnet 26 is in said first position and allow full flow of current to the electrical component 25 when said magnet 26 is in said second position. In the alternative, the hall sensor 24*h* is arranged to restrict or prevent flow of current to the electrical component 25 when the magnet 26 is in said second position and allow full flow of current to the electrical component 25 when said magnet 26 is in said first position.

In the preferred arrangement and as shown in the drawings, the electrical switch 24, 24*h* is mounted on a base portion 27, which may comprise one of a number of components but preferably comprises the body of the valve itself 12 or a housing 14 surrounding the valve 12. This housing 14 is described in more detail later herein. It is important to note that the mounting of the switch 24,24*h* on a relatively immobile object will allow for the easy routing of electrical circuitry associated therewith but it is always possible to reverse the situation and have the magnet 26 mounted on a relatively stationary portion and the switch 24, 24*h* on a movable portion. The magnet 26 is mounted on or in association with the actuator/handle 22 such as to be movable therewith. In a preferred arrangement the magnet 26 is mounted on a pivot arm 30 having a pivot point 32 and being pivotal between a first position C in which the magnet 26 is in close proximity to said switch and causes operation thereof and a second position D in which the magnet 26 is distanced from said switch 24 and is unable to cause operation thereof.

Figure 6:
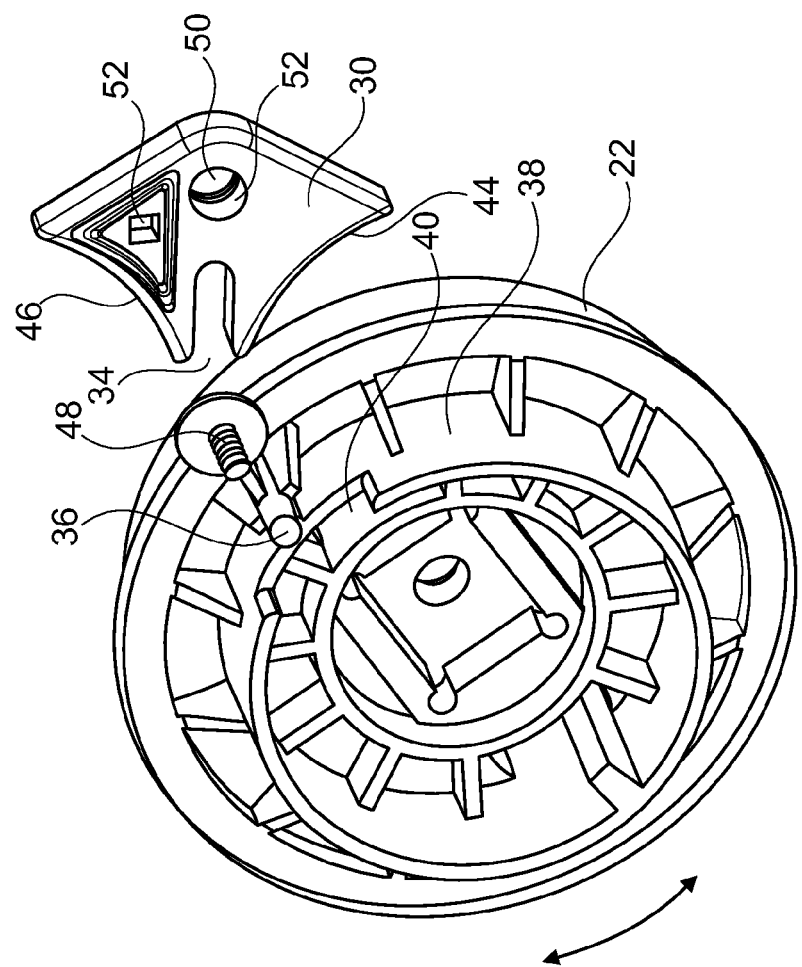
FIG. 6 is an exploded view of the arrangement of FIG. 5 taken in the direction of arrow B and illustrates the points of interaction between the actuator handle and the switch elements.
Figure 5:
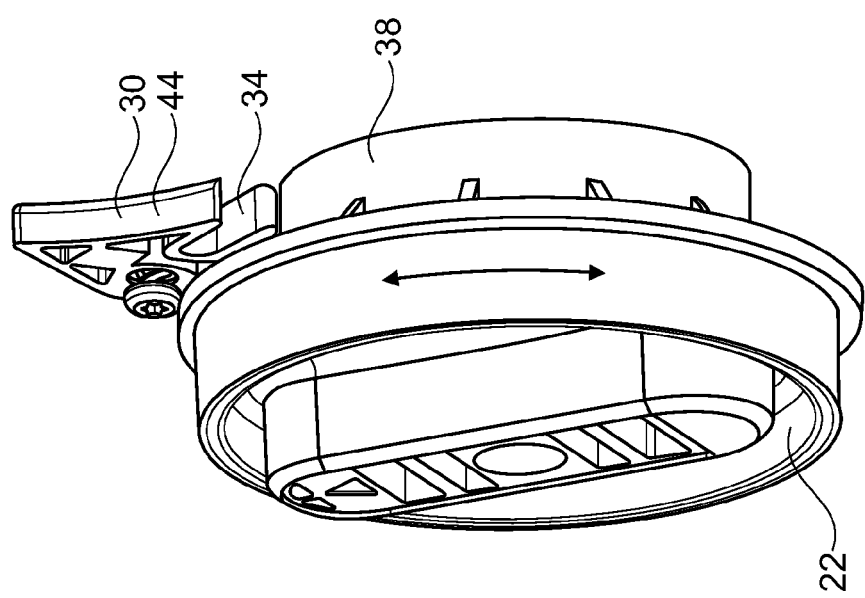
FIG. 5 is an isometric isolated view of an actuator and elements of the switch referred to above.

A particularly useful arrangement of pivot arm 30 comprises a lost motion mechanism 32 such as, for example, a "Geneva Mechanism" well known in the clock industry. Such a mechanism is shown more particularly in FIGS. 5 to 8 and wherein the component with reference 22 comprises the handle or actuator 22, as discussed above and shown in FIGS. 1 to 4. Further components include the pivot arm 30 which includes a slot 34 for engagement with a corresponding movement member or pin 36 provided on the handle 22. The handle is preferably provided with a location surface 38 extending around a circumference and including a cut-out 40 into which the pivot arm may protrude as it moves between positions. The pivot arm itself 30 is preferably provided with a pair of location surfaces 44, 46, each of which is shaped to correspond to the circumferentially extending surface 38 on the handle 22. In essence, the surfaces 44, 46 are arcuate in shape having a centre of curvature the same or substantially similar to that of surface 38 such that, in operation, surfaces 44, 46 are able to sit on and cooperate with surface 38 when the handle 22 is moved between positions. A screw or pin arrangement 48 may be used to secure the pivot arm 30 to the base portion 27 and is arranged such as to create the pivot point 32 about which the pivot arm 30 pivots. Other options to the screw or pin arrangement 48 include rivets and clips and other such similar items. A suitable hole 50 is provided in arm 30 such as to accommodate screw 48 and create an inner surface 52 which rotates around the screw 48. The pivot arm 30 may also be provided with a recess 52 on one side of hole 50 and adjacent surface 46 for receiving magnet 26. A biasing member shown schematically at 54 in FIGS. 5 and 6 may be provided to bias the pivot arm 30 into one of its two positions, each of which are discussed below.

Other elements of the invention are shown more clearly in FIGS. 1 to 4 and comprise an electrical component 25 such as a display or panel or warning system, preferably having a fully operational mode and a standby mode but optionally having a fully operational mode and an off mode. A source of electrical power such a, for example, a battery shown schematically as 62 in FIG. 1 is connected to the electrical component 25 via switch 24, 24*h* such as to control the level of electrical current supplied thereto dependent upon the position of the switch 24, 24*h*. An electric circuit may be created by means of a wiring loom or individual cables or by means of a circuit board 64 which is used to connect the source of electricity to the electrical component and includes said switch 24, 24*h* as part of the circuitry. The circuit itself is preferably mounted on said base portion 27 and, as illustrated in FIG. 1, this preferably comprises a surface 14*s* of housing 14 which surrounds the valve body itself. In a preferred arrangement the electrical circuit comprises a circuit board 64 having a substantially rigid portions 64*r* upon which the switch may be mounted and one or more flexible portions 64*f* which allow the circuit board to mould to the shape of the housing 14 between said rigid portion 64*r* and said electrical component 25.

The electrical component 25 may comprise any one of a number of things but preferably comprises a visual display able to display gas flow information as determined by the detection of the position of the valve through the activation or otherwise of switch 24, 24*h*. Such a display would be able to warn an operator that the valve was not correctly closed or opened and may also be able to display primary gas flow information or visual or audible warnings to an operator. Clearly, such a device would not be required if it is certain that the valve is folly closed and, hence, the present invention provides a switching system associated with the position of the valve which enables the flow of electrical current to be adjusted appropriately depending upon the valve position and the need for the electrical component. In a particular arrangement the electrical component has a fully operational mode and a standby mode and the switch 24, 24*h* is connected thereto such as to allow a first higher level of current flow when the electrical component is in fully operational mode and a reduced current flow when it is in sleep or standby mode.

The arrangement may also include a detector 70 shown schematically in FIG. 2 for cooperation with a feature or transmitter 72 associated with the valve 12 for detecting a fully open state of the valve 12. It may also include a further or secondary flow control valve 74 downstream of the primary flow control valve 12 which may be used to cause fine adjustments to the flow of gas. The secondary control valve 74 may also be provided with a position detector as shown schematically at 76 in FIG. 1 to determine the position of the secondary control valve 74 and the output therefrom may be linked to the electrical component 25 for displaying primary gas flow.

Figure 7:
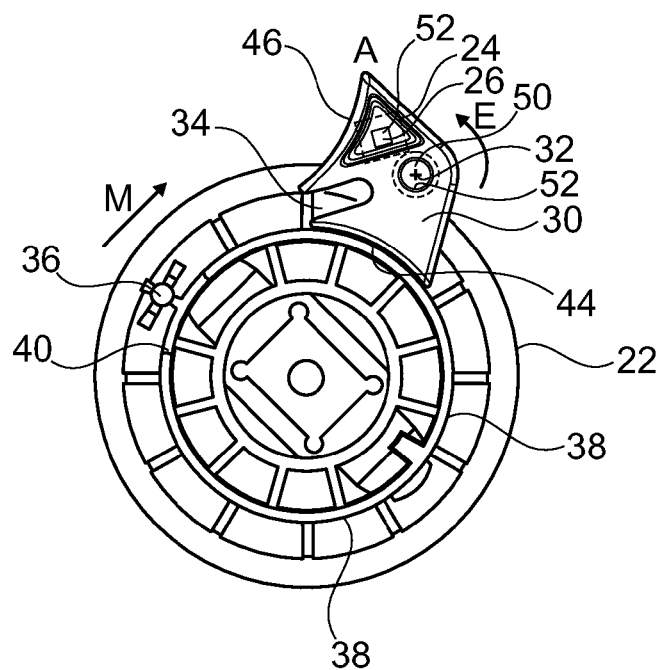
FIGS. 7 and 8 illustrate the switch and handle arrangements in first and second positions.
Figure 8:
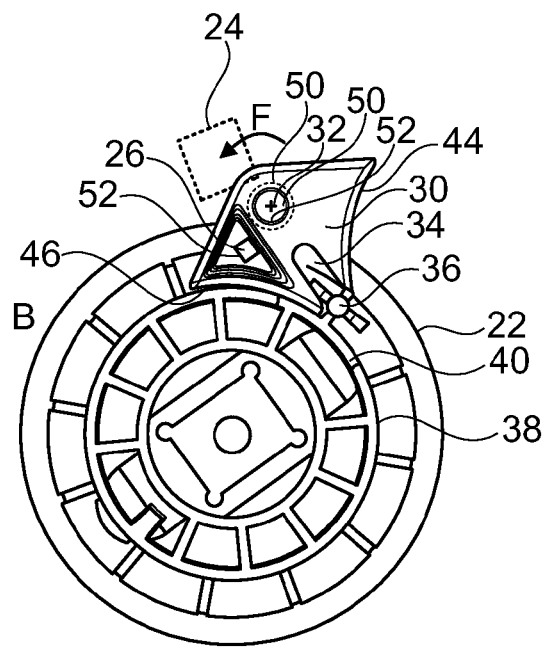

The operation of the lost motion mechanism is best appreciated with reference to FIGS. 7 and 8 in particular which illustrate the two positions of the mechanism. FIG. 7 illustrates the position when the magnet 26 is positioned in a first position A in which it is in close proximity to the hall sensor 24*h* and FIG. 8 illustrates the arrangement when the magnet 26 has been moved to its second position B were it is no longer in close proximity to the hall sensor 24*h*.

Referring first to FIG. 7, it will be appreciated that the first surface 44 of pivot mechanism 30 is arranged to be in sliding cooperation with surface 38 on the handle 22 and the magnet 26 is positioned in a first position A in which it is in close proximity or association with the switch (shown in dotted profile). Movement of the handle 22 in the direction of arrow M will cause pin 36 to move towards slot 34 until it engages therein. The opening 40 is positioned beneath the pin such as to allow the pivot arm 30 to rotate about axis 32 and extend temporality beyond surface 38 such that it pivots between position E (FIG. 7) and position F (FIG. 8). It will be appreciated that this movement will cause the magnet to move to its second position B where it is not in association with the switch/hall sensor 24, 24h and suitable control of the supply of current to the electrical device 25 may be initiated.

It will be appreciated that the above discussed arrangement provides a way of controlling the supply of electrical current to an electrical component depending upon the state or position of a flow control valve and may, thus, be used to initiate control over the supply of current which allows for longer battery life and reduced maintenance. Often such maintenance would require the unit to be returned to the manufacturer for the simple installation of a new battery so any method of reducing this requirement would be extremely beneficial.

It will also be appreciated that a Hall Sensor 24h comprises a magnetic switch which, in the presence of a magnetic field switches between one state of operation and another. In this arrangement the first state may be closed such as to allow a full current flow and the second state could be such as to allow only a limited or "stand by" flow of current. The reverse may also be used.

Still further, it will be appreciated that individual items described above may be used on their own or in combination with other items shown in the drawings or described in the description and that items mentioned in the same sentence as each other or the same drawing as each other need not be used in combination with each other. In addition the expression "means" may be replaced by actuator or system or device as may be desirable. In addition, any reference to "comprising" or "consisting" is not intended to be limiting any way whatsoever and the reader should interpret the description and claims accordingly.

The invention claimed is:

1. A flow apparatus for a vessel storing fluid under pressure having a flow control valve having a housing and an outlet aperture and further including a valve seat and a sealing member for sealing against said seat such as to obturate said outlet, said apparatus further including an actuator connected to said sealing member for moving said sealing member between an open position of the valve in which said sealing member unobturates the outlet aperture and a closed position in which said sealing member obturates said outlet, including an electrical switch for controlling a supply of electrical current to one or more electrical components and wherein said switch is operably connected to said sealing member, such that movement of the sealing member from the open position to the closed position causes the switch to shift between a first position and a second position, wherein a passage of full current is allowed to flow when said valve is in the first position and a limited or stand by current that is greater than zero is allowed to flow when said valve is in the second position, wherein at least one of said one or more electrical components has a fully operational mode and a standby mode and wherein said switch is connected thereto for allowing a first, higher, level of current to said component when in said fully operational mode and a second, lower, level of current to said component when in said standby mode.

2. The flow apparatus as claimed in claim 1, wherein said first position is the open position of the valve and said second position is the closed position of the valve.

3. The flow control apparatus as claimed in claim 2, wherein said electrical switch is mounted on a base portion and a magnet is mounted on a pivotal arm having a pivot point and being pivotal between the first position in which the magnet is in close proximity to said switch and the second position in which the magnet is distanced from said switch.

4. The flow control apparatus as claimed in claim 2, wherein said electrical switch is mounted on a base portion and a magnet is mounted on a pivotal arm having a pivot point and being pivotal between the first position in which the magnet is in close proximity to said switch and the second position in which the magnet is distanced from said switch and in which said base portion comprises said valve.

5. The flow control apparatus as claimed in claim 2, wherein said electrical switch is mounted on a base portion and a magnet is mounted on a pivotal arm having a pivot point and being pivotal between the first position in which the magnet is in close proximity to said switch and the second position in which the magnet is distanced from said switch, and in which said base portion comprises said housing.

6. The flow control apparatus as claimed in claim 2, wherein said electrical switch is mounted on a base portion and a magnet is mounted on a pivotal arm having a pivot point and being pivotal between the first position in which the magnet is in close proximity to said switch and the second position in which the magnet is distanced from said switch and said pivotal arm comprises a lost motion mechanism including a slot therein and wherein said actuator includes a pin mounted for movement therewith between the first position in which the pin is not engaged with said slot (34) and the second position in which the pin is engaged with said slot and causes said arm to rotate about said pivot point and cause said magnet to move towards said first position.

7. The flow control apparatus as claimed in claim 2, wherein said electrical switch is mounted on a base portion and a magnet is mounted on a pivotal arm having a pivot point and being pivotal between the first position in which the magnet is in close proximity to said switch and the second position in which the magnet is distanced from said switch and said pivotal arm comprises a lost motion mechanism including a slot therein and wherein said actuator includes a pin mounted for movement therewith between the first position in which the pin is not engaged with said slot and the second position in which the pin is engaged with said slot and causes said arm to rotate about said pivot point and cause said magnet to move towards said first position and said lost motion mechanism comprises a Geneva mechanism.

8. The flow control apparatus as claimed in claim 2, wherein said electrical switch is mounted on a base portion and a magnet is mounted on a pivotal arm having a pivot point and being pivotal between the first position in which the magnet is in close proximity to said switch and the second position in which the magnet is distanced from said switch, and including a biasing member for biasing said pivotal arm towards said second position.

9. The flow control apparatus as claimed in claim 2, wherein said electrical switch is mounted on a base portion and a magnet is mounted on a pivotal arm having a pivot point and being pivotal between the first position in which the magnet is in close proximity to said switch and the second position in which the magnet is distanced from said switch, and including a biasing member for biasing said pivotal arm towards said first position.

10. The flow apparatus as claimed in claim 1, wherein said first position is the closed position of the valve and said second position is the open position of the valve.

11. The flow apparatus as claimed in claim 1, wherein said switch comprises a hall sensor and said apparatus further includes a magnet movable with said sealing member between the first position in which the sealing member is in association with the hall sensor and indicates a first operable state of the valve and the second position in which the sealing member is not in association with the hall sensor and indicates a second operable state of the valve.

12. The flow apparatus as claimed in claim 11, wherein said hall sensor is operable to restrict flow of current to said electrical components when said magnet is in said first position and allow full flow of current to said electrical components when in said second position.

13. The flow apparatus as claimed in claim 11, wherein said hall sensor is operable to restrict flow of current to said electrical components when said magnet is in said second position and allow full flow of current to said electrical components when in said first position.

14. The flow control apparatus as claimed in claim 1, including a circuit board including said switch and being connected to a supply of electricity and said electrical component and wherein said circuit board is mounted on a surface of the housing.

15. The flow control apparatus as claimed in claim 1, including a circuit board including said switch and being connected to a supply of electricity and said electrical component and wherein said circuit board is mounted on a surface of the housing in which said circuit board comprises a substantially rigid portion on which said switch is mounted and a flexible portion between said rigid portion and said electrical component.

16. The flow control apparatus as claimed in claim 1, wherein said valve comprises a primary on/off control valve for a gas cylinder.

17. The flow control apparatus as claimed in claim 1, wherein said valve further includes a fully open position and a detector for detecting a fully open position of the valve.

18. The flow control apparatus as claimed in claim 1, wherein said electrical component comprises a visual display unit for displaying gas flow information as determined by the detection of the position of the valve.

19. The flow control apparatus as claimed in claim 18, wherein said apparatus includes a circuit board including a position monitor and being connected to a supply of electricity and said electrical component and wherein said circuit board is mounted on a surface of a base portion.

20. The flow control apparatus as claimed in claim 1, including a second flow control valve downstream of said valve for controlling a rate of flow from the apparatus and wherein said second control valve includes a position monitor for monitoring the position thereof and wherein said position monitor is operably connected to a visual display unit for displaying gas flow information as determined by the detection of the position of the second control valve.

21. The flow control apparatus as claimed in claim 20, wherein said apparatus includes a circuit board including a position monitor and being connected to a supply of electricity and said electrical component and wherein said circuit board is mounted on a surface of a base portion.

22. The flow apparatus as claimed in claim 1, wherein the one or more electrical components is operable to determine fluid flow information based on a position of the valve.

23. The flow apparatus as claimed in claim 22, wherein the one or more electrical components is operable to display the fluid flow information.

* * * * *